United States Patent [19]
Gratzer

[11] Patent Number: 5,096,382
[45] Date of Patent: Mar. 17, 1992

[54] RING-SHROUDED PROPELLER

[76] Inventor: Louis B. Gratzer, 2201 3rd Ave., #2004, Seattle, Wash. 98121

[21] Appl. No.: 511,050

[22] Filed: Apr. 19, 1990

Related U.S. Application Data

[63] Continuation-in-part of Ser. No. 353,002, May 17, 1989, abandoned.

[51] Int. Cl.$^5$ ............................................. F01D 5/22
[52] U.S. Cl. ..................................... 416/189; 416/195
[58] Field of Search .................... 416/23, 189 R, 190, 416/191, 193 R, 195; 415/211.1, 228

[56] References Cited

U.S. PATENT DOCUMENTS

| | | | |
|---|---|---|---|
| 855,131 | 5/1907 | Freidel | 416/189 R |
| 987,624 | 3/1911 | Hansen | 416/189 R |
| 1,518,501 | 12/1924 | Gill | 416/189 R |
| 1,635,966 | 7/1927 | Stanton | 416/189 R |
| 1,739,866 | 12/1929 | Schuh | 416/193 R |
| 2,088,802 | 8/1937 | McLaughlin | 416/189 B |
| 2,091,677 | 8/1937 | Fredericks | 416/189 R |
| 2,411,271 | 11/1946 | Jackson | 416/193 |
| 2,724,544 | 11/1955 | Hardigg | 416/189 R |
| 3,549,272 | 12/1970 | Bauger et al. | 416/193 |
| 4,767,270 | 8/1988 | Seidel | 416/189 R |

FOREIGN PATENT DOCUMENTS

| | | | |
|---|---|---|---|
| 669167 | 11/1929 | France | 416/189 B |
| 951186 | 10/1949 | France | 416/189 B |
| 585534 | 1/1960 | Italy | 416/191 |
| 43391 | 2/1957 | Japan | 416/189 R |
| 121192 | 6/1985 | Japan | 416/189 B |
| 1141044 | 2/1985 | U.S.S.R. | 416/189 B |
| 991744 | 5/1965 | United Kingdom | 416/189 R |
| 1324356 | 7/1973 | United Kingdom | 416/189 B |

*Primary Examiner*—John T. Kwon

[57] ABSTRACT

The ring-shaped propeller, in its basic form, comprises a multi-blade propeller and a structurally continuous ring-shroud attached to the tips of the blades. The shroud has an airfoil cross-section which varies from blade tip to blade tip, the segments between adjacent blades being identical. The airfoil section varies essentially linearly in camber and twist and this results in rather abrupt reversals in the shroud airfoil section at each blade tip. Aerodynamic loading of the blades and shroud at the junctures between the blades and shroud are matched so that the tendency for blade tip vortices to form and the tendency for shroud transitional portions to generate vortices of rotation opposite to blade tip vortex rotation are in balance and no top vortices are formed. Instead there is a uniform vorticity shed from the shroud trailing edge. Two concentric shrouds may be used and the concept adapts to use with rotor/stator systems and dual, counter-rotating propeller systems.

In addition to the primarily aeronautical applications described above, the application of these principles of design can be extended to fans or compressors for industrial use, propellers and systems for submarines and ships, and household products such as cooling fans, dryers, vacuum cleaners, etc.

Having described the invention in some of its preferred forms, it is recognized that other embodiments and changes and modifications of those described are within the scope of the invention which is limited only by the attached claims.

It is considered understandable from this disclosure that the subject invention meets its objectives. The ring-shroud propeller prevents development of blade tip vortices at a design point. It is adaptable to incorporation of variable geometry which enables prevention and/or inhibition of generation of tip vortices over a range of operation around the design point. More than one shroud can be used on the propeller and the ring-shrouded propeller is usable in dual counter-rotating propeller installation and propeller/stator combinations.

3 Claims, 6 Drawing Sheets

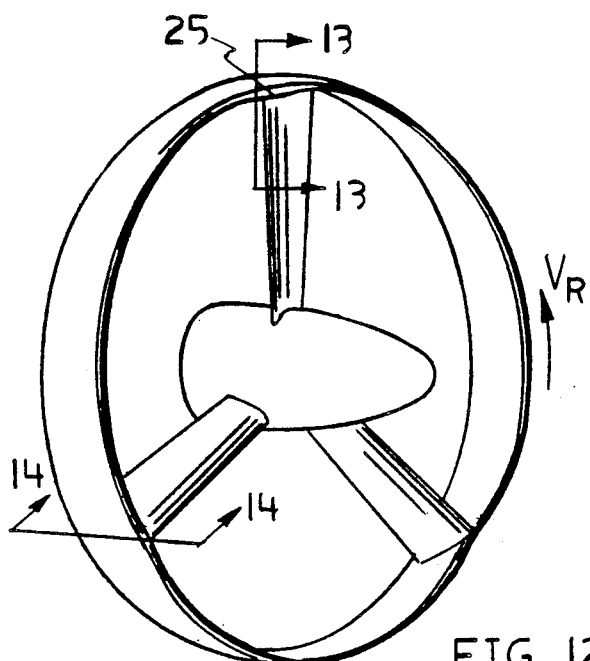
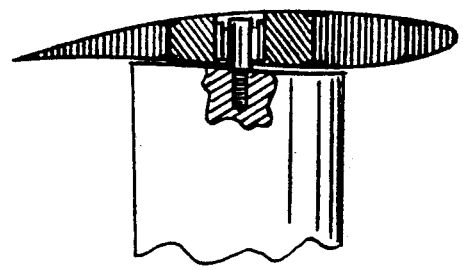
FIG. 12
FIG. 13
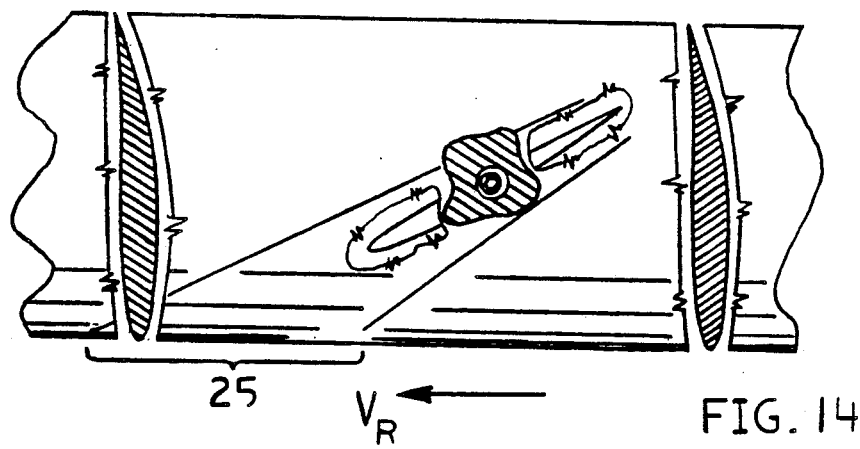
FIG. 14
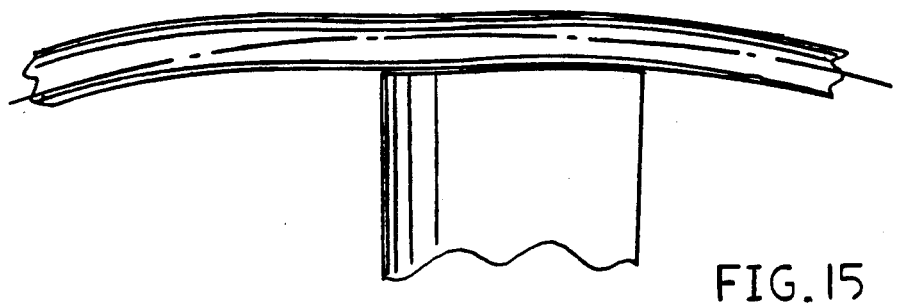
FIG. 15

5,096,382

RING-SHROUDED PROPELLER

This application is a Continuation-In-Part of application Ser. No. 353,002, Filed May 17, 1989, now abandoned.

BACKGROUND OF THE INVENTION

1. Field

The subject invention is in the field of bladed propellers, particularly those for aircraft. More specifically it is in the field of propellers which incorporate a generally cylindrical shroud and still more specifically, propellers incorporating such a shroud attached to the propeller blades and rotating with the propeller hub and blades.

2. Prior Art

The patents listed below constitute a sampling of the prior art in this field.

| U.S. Pat. Nos.: | 855,131 | 2,091,677 |
|---|---|---|
| | 987,624 | 2,411,271 |
| | 1,518,501 | 2,724,544 |
| | 1,635,966 | 3,549,272 |
| | 1,739,866 | 4,767,270 |
| | 2,088,802 | |
| French Patents: | 669,167 | 951,186 |
| Great Britain: | 991,744 | 1,324,356 |
| Japan: | 121,192 (1985) | 43,391 (1987) |
| Italy: | 585,534 | |
| Russia: | 1,141,044 | |

As is well known in the art, all propeller designs involve design compromises based on many factors including cost, weight, size, noise produced and efficiency, all related to the engine (prime mover) power converted to thrust by the propeller. In current state of the art aircraft using propellers the amount of power and therefore the overall performance of an airplane is often limited not by the prime mover power available but by the amount of power which can be converted to thrust within the limitations of propeller size, propeller efficiency and noise produced. All three factors are strongly related to the strengths of the vortices which are generated at the tips of propeller blades. Generally speaking, when the power level is high relative to propeller diameter (i.e. size is held to a minimum for the power level) the vortices are strong and efficiency is sacrificed and noise levels are high. It has long been recognized, as evidenced by the listed prior art, that the design compromise among power level, propeller size, efficiency and noise produced can be improved by enclosing the propeller in a shroud in an attempt to minimize the losses and noise levels associated with tip vortices. Use of prior art shrouding technique with propellers has not proven sufficiently successful to warrant significant commercial success and related widespread use. This lack of success is attributable to (1) the fact that while prior art shrouds tend to diffuse and/or disperse tip vortices at the blade tips, the vortices reform at virtually full strength some distance downstream from the propeller plane, limiting the benefits of the shroud, and (2) the costs of incorporating shrouds more than offset these limited benefits, the costs including manufacturing and use costs and the functional penalties such as weight, aerodynamic drag, etc.

The turbofan engine, which uses a multi-bladed fan in combination with a fixed shroud, is a somewhat related application. However, it has significant characteristic disadvantages and is not adaptable to and will not realize the benefits of using the rotating ring shroud with varying camber and twist according to the subject invention.

It will be understood by those skilled in the art that the function of a shroud in limiting or preventing blade tip vortices and the associated losses in efficiency is dependent on a variety of variable factors, the result being that with fixed geometry blades and rotating ring-shroud the performance will be optimum at a functional design point and tending to degrade as the function moves away from the design point. This tendency to degrade can be significantly lessened by the use of variable geometry of the blades and shroud, blade geometry varying in pitch angle and shroud geometry varying in camber and twist. Also, for maximum successful utilization, the shroud must be adaptable to use on a variety of types of propellers, including counter-rotating sets. Also, it will be advantageous if the shroud is adaptable for use of more than one shroud on a propeller.

Accordingly, it is a prime objective of the subject invention to provide a shrouded propeller which prevents development of blade tip vortices at a performance design point. A second objective is to provide a ring-shrouded propeller which is adaptable to incorporation of variable geometry such that development of blade tip vortices is prevented and/or inhibited over a range of performance around the design point. A further objective is that the ring-shrouded propeller and the shroud be adaptable to use of more than one shroud on a propeller. Also it is an objective that the ring-shrouded propeller be adaptable for use in dual counter-rotating propeller installations and propeller/stator combinations.

SUMMARY OF THE INVENTION

The subject invention is a shrouded propeller particularly for aircraft use. The shroud is attached to the propeller blades and rotates with them; however, it is adaptable for use on stators used in combination with propellers, in which case the shroud is static. Such shrouds are characteristically cylindrical and have cambered airfoil sections which operate at varying angles of attack to the relative airflow. In the subject shroud the camber and angles of attack (as influenced by the angle of twist of the shroud as described below) vary in a specific way from blade to blade. The shroud comprises N sections for a propeller having N blades and the sections are identical and form a structurally continuous ring. For purposes of this description, each section extends from the under (windward) side of a first blade to the top (leeward) side of a second. At the section end adjacent the first blade the angle of twist is such that the angle of attack of the shroud is positive; i.e. this part of the section tends to divert air into the flow through the propeller and the shroud is cambered in this part to facilitate such diversion.

At the section end adjacent the second blade the angle of twist is such that the angle of attack is negative; i.e., the shroud tends to divert airflow out of the flow through the propeller and the shroud is cambered to facilitate the diversion. The twist and camber in each section vary from first to second ends to produce linear aerodynamic loading from blade to blade. Accordingly, at the midpoint between blades the angle of twist and angle of attack are essentially zero and the airfoil section is symmetrical, i.e. uncambered.

The basic function of a shroud configured in this way is described here with reference to FIGS. 1–6. FIGS. 1 and 5 illustrate the vortices generated at the tips of unshrouded blades. In FIG. 5 the vortex is counterclockwise under the operating conditions illustrated and unshrouded propellers produce vortices as shown in FIG. 1.

FIG. 6 illustrates the flow characteristics which would occur at the junction of two shroud sections $S_1$ and $S_2$ if there were no blade tip present. The sudden reversals in twist angle and camber produce a clockwise vortex under the flow conditions illustrated, the same intensity but opposite sense to that in FIG. 5. In FIG. 6 angles $\alpha A$ and $\alpha B$ indicate that the angle of attack is positive in section $S_1$ of the shroud and negative on section $S_2$.

With the blade tip present at the transitional portion between shroud sections, as shown in FIG. 4, the tendencies for the formation of the two opposite rotation vortices prevent either vortex from forming and cause the flow off the trailing edges of the blades and shroud to take place in the form of many minute vortices distributed along the trailing edges, as shown in FIG. 3. This form of flow from the propeller is known to involve least energy loss, i.e. maximum efficiency and also minimum noise generation for a given propeller loading.

In FIGS. 1–3, forward velocities are indicated by arrows $V_F$, rotation direction by arrows $V_R$, and vortex direction by the small, partial circle arrows. In FIG. 2 diffused vortices are indicated by shaded bands indicating the vortex trails. Concentrated vortex trails are indicated by lines T.

Shrouds which are uniform around the circumference of the propeller will produce only modest beneficial effects. As indicated in FIG. 2, such a shroud tends to diffuse the tip vortices but the vortices roll up and reform at virtually full strength a distance downstream from the propeller plane.

The invention is described in more detail below with reference to the attached drawings.

BRIEF DESCRIPTION OF THE DRAWINGS

FIG. 10B shows a schematic cross-section of the shroud at 10B—10B in FIG. 10A.

FIG. 10C shows a schematic cross-section of the shroud at 10C—10C in FIG. 10A.

FIG. 12 is an oblique view of a three-bladed aircraft propeller with a ring-shroud of alternate design attached at the blade tip.

FIG. 13 shows a cross-section 13—13 from FIG. 12 of the ring shroud (alternate design) with a portion of a propeller blade. This view illustrates ring structural detail and the method of attachment to the propeller blades.

FIG. 14 is a cutaway projection 14—14 from FIG. 12 showing a portion of the ring-shroud and the propeller blade tip.

FIG. 15 is an orthogonal projection of FIG. 14 showing portions of the propeller blade and the ring shroud including leading edge detail.

DETAILED DESCRIPTION OF INVENTION

Figure 7:
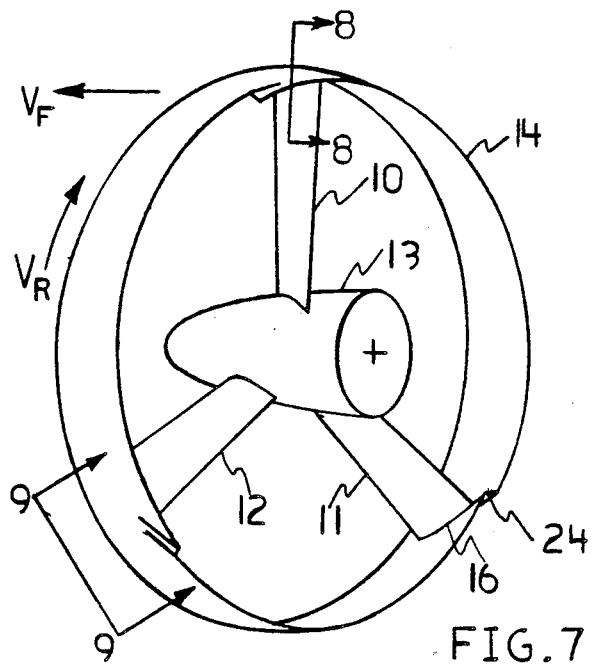
FIG. 7 is an oblique view of a three-bladed aircraft propeller with a ring-shroud attached at the blade tips.
Figure 8:
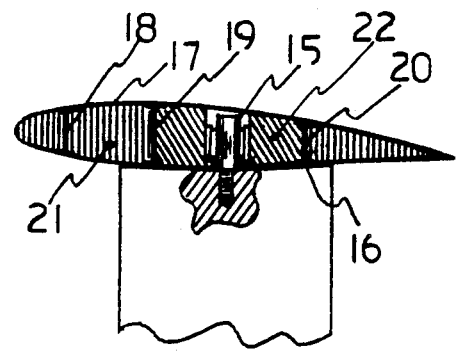
FIG. 8 shows a cross-section 8—8 from FIG. 7 of the ring-shroud with a portion of a propeller blade. This view illustrates the ring-shroud structural detail and the method of attachment to the propeller blades.
Figure 9:
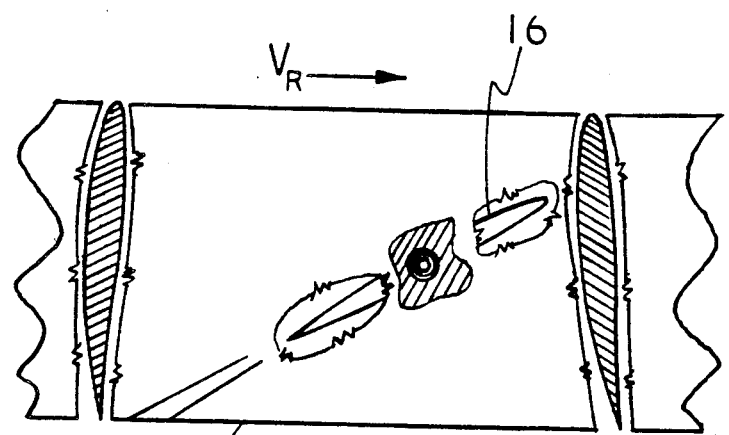
FIG. 9 is a cutaway, sectioned projection 9—9 from FIG. 7 showing a portion of the ring-shroud and the propeller blade tip (hidden).
Figure 10:
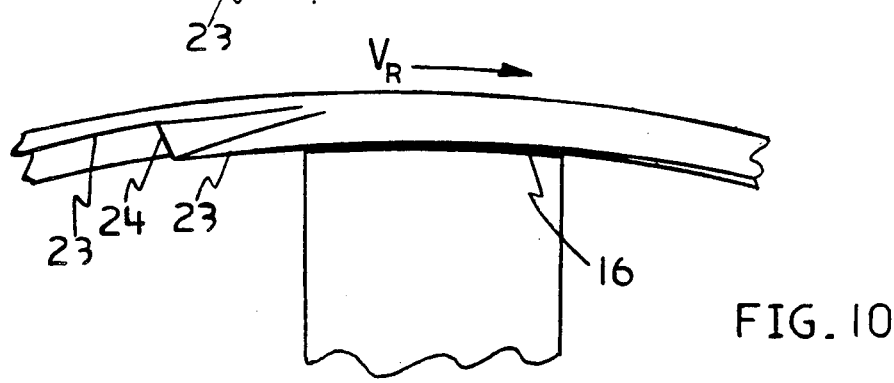
FIG. 10 is an orthogonal projection of FIG. 9 showing portions of a propeller blade and the ring-shroud including trailing edge detail.

As shown on the drawings, I have chosen to illustrate the essential features of the invention using several different propeller and ring-shroud combinations. FIG. 7 shows a propeller with three blades 10, 11 and 12 supported from a hub 13 which contains a typical mechanism to control blade pitch by rotating the blades about their spanwise axes. The ring-shroud 14 is structurally continuous and supported by pivots 15 (FIG. 8) at the tip 16 of each blade which allow the blades to be rotated about their axes throughout the normal operating range of the propeller. The ring-shroud cross-sections are airfoil shapes selected to match the propeller blade geometry (i.e. planform, twist) and to accommodate the desired performance and operating range of an aircraft on which the propeller is used. This selection is made in concert with the determination of the shroud chord at a value normally between about one and two times the blade tip chord. The detail of the shroud pivot support is shown in FIG. 8 which also illustrates desired structural features for the shroud. FIG. 8 is a sectional view taken at 8—8 in FIG. 7. Ideally, the structure should be a continuous bonded composite assembly comprising an outer shell 17 supported by three continuous spars 18, 19 and 20 and a stabilizing core 21 such as honeycomb or low density foam. At each pivot location a dense core section 22 is provided to transfer pivot loads to the surrounding structure. The pivot bolt 15 secures the shroud to the propeller blades without constraint along the blade axes. The structurally continuous shroud comprises sections extending from one blade to the next. Each section is twisted and cambered and the twist and camber vary from one end of each section to the other to produce a near-linear variation in shroud loading between one blade and the next. The complex relationships involved are illustrated in FIGS. 9 and 10. FIG. 9 is an expanded sectional and cutaway view of projection 9—9 (FIG. 7) which includes the blade tip 16 and also cross-sections, FIGS. 9A and 9B, showing the large twist and camber reversal near the propeller blade tip. FIG. 10 is a rear view of FIG. 9 which highlights the shroud trailing edge 23 having a linear twist and camber variation. This corresponds to radial loading changing from outward to inward for clockwise progression between adjacent blades. The load, as well as twist and camber, will reverse sharply near each propeller blade resulting in jog 24 (see also, FIG. 7). Each jog is followed by another linearly twisted shroud section resulting in a cyclic variation of twist and camber around the shroud circumference.

Figure 10A:
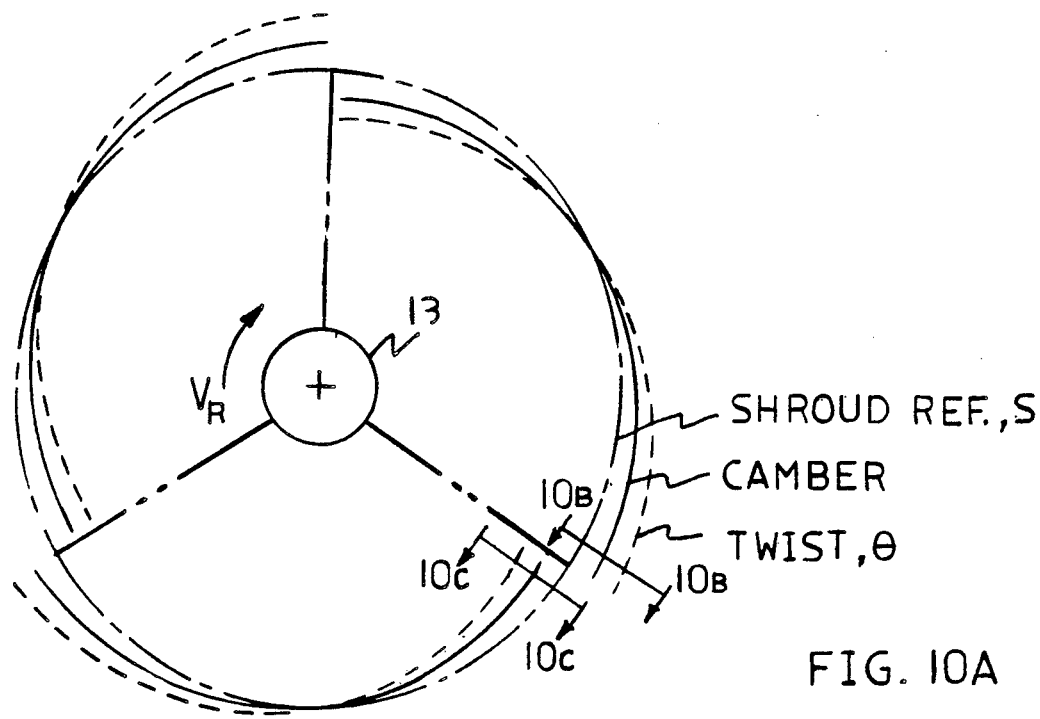
FIG. 10A is a graphical illustration of the variations of camber and twist of the shroud of a ring-shrouded, 3 bladed propeller according to the subject invention.
Figure 10:
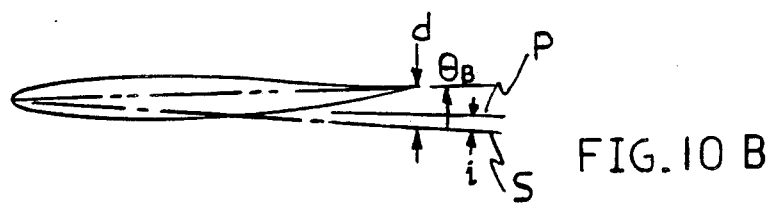
Figure 10:
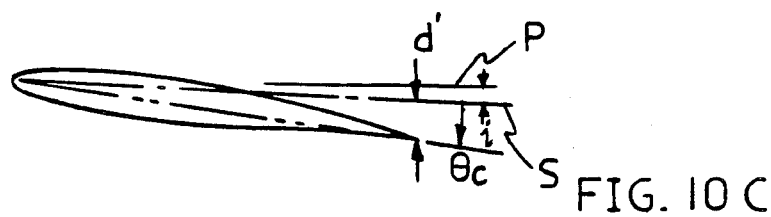

FIG. 10A is a graphical illustration of the variations of camber and twist of the shroud of a ring-shrouded 3-bladed propeller according to the subject invention. The blades are represented by the heavy radial lines. The hub is represented by the small circle. The dash-dot circle is a reference line for the shroud. The dotted line is a plot of the shroud camber along the shroud; the solid line is a plot of the twist along the shroud.

FIG. 10B is a schematic cross-section of the shroud at 10B—10B in FIG. 10A and FIG. 10C is a schematic cross-section of the airfoil shaped cross-section of the shroud at 10C—10C in FIG. 10A. The angles in FIGS. 10B and 10C are the angles of twist ($\theta_B$ and $\theta_C$) in the shroud at these two cross-sections, the angles being measured from a conical surface termed the shroud reference represented by the lines labeled S in FIGS. 10B and 10C. The angle of incidence i is the angle between the shroud reference and the propeller axis reference labeled P in FIGS. 10B and 10C. This angle is constant and is not shown in FIG. 10A. In the embodiment of the invention shown in FIG. 7 the leading edge of the shroud is circular and uniform and the deviations d in FIG. 10B and d' in FIG. 10C add up to the jog dimension in the trailing edge of the shroud between the cross-sections shown in FIGS. 10B and 10C.

The airfoil section shown in FIG. 10C tends to direct airflow into the flow through the propeller arc and, for purposes of this disclosure, has positive twist and camber. The airfoil section shown in FIG. 10B tends to direct airflow away from the propeller arc and, for purposes of this disclosure, is said to have negative twist and camber.

Figure 1:
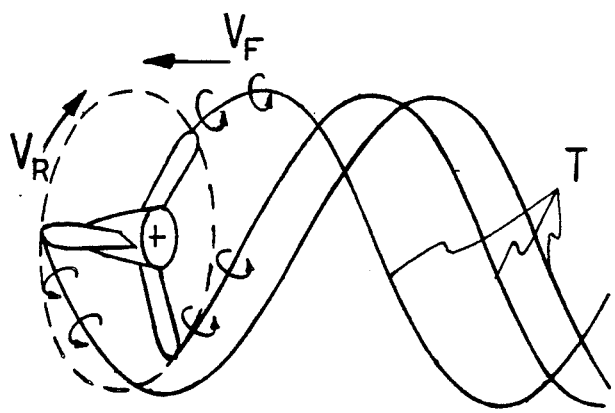
FIG. 1 is a schematic representation showing the vortices generated by a conventional, unshrouded propeller.
Figure 3:
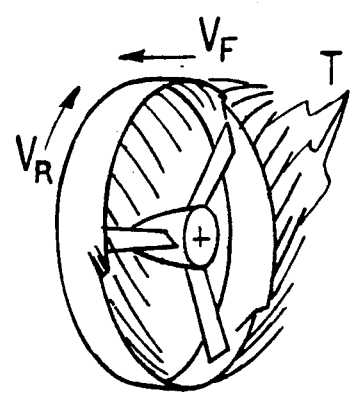
FIG. 3 is a schematic representation showing the uniform distribution of minute vortices which are generated by a propeller fitted with the subject shroud and modified to optimize its use.
Figure 2:
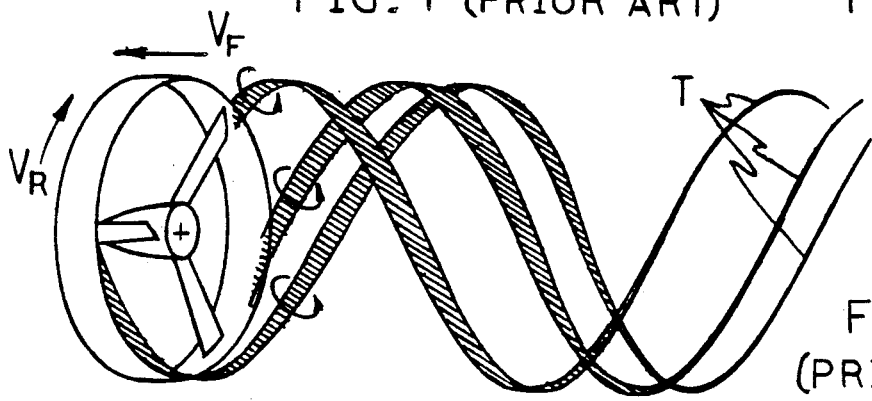
FIG. 2 is a schematic representation showing the vortices generated by a conventional propeller equipped with a conventional, uniform shroud.
Figure 5:
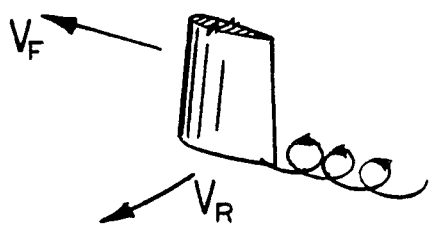
FIG. 5 is a schematic depiction of the vortex which would be generated by the blade only of FIG. 4.
Figure 4:
FIG. 4 is a schematic view of a juncture of a blade and an adjacent portion of the shroud according to the subject invention.
Figure 6:
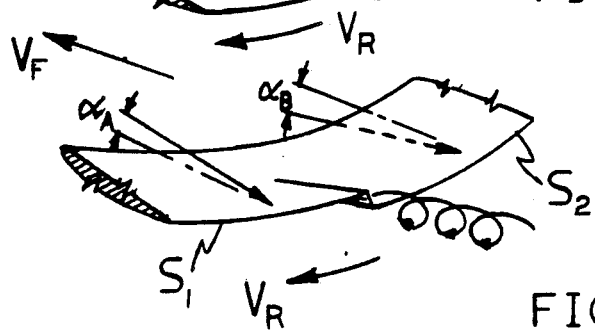
FIG. 6 is a schematic depiction of the vortex which would be generated by the shroud portion only of FIG. 4.
Figure 11:
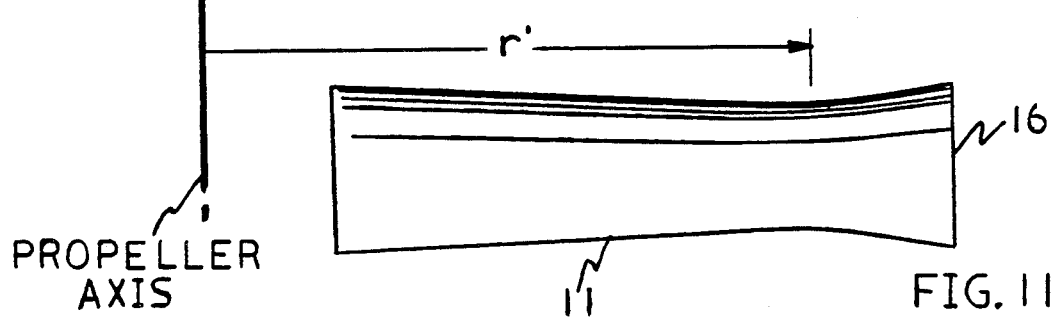
FIG. 11 is a schematic drawing showing the modification of a conventional blade to optimize the performance of the propeller/shroud combination of the subject invention.

The propeller blade will generally have modest taper as appropriate for a nearly constant blade circulation from root to tip except near the hub. An increase in blade chord near the tip will usually be desirable to avoid excessive local loading of the shroud, as shown in FIG. 11, a schematic drawing showing the modifications of a conventional blade to optimize the performance of the propeller and shroud combination of the subject invention. The blade 11 is tapered conventionally to radius r' from the axis of the propeller and then reverse tapered out to tip 16. This combination of propeller and shroud geometry will give a constant circulation along the blade axis except near the hub and constant vorticity shed from the shroud trailing edge (see FIG. 3) as required for optimum performance. For the shroud with fixed trailing edge, as shown, there are specific geometric parameters (i.e. blade angle, camber, twist, etc.) and operating conditions corresponding to best performance. However, operation through a restricted range of off-design conditions need not entail significant departures from the optimum performance.

While the configuration discussed previously will generally be favored, an alternative is shown in FIG. 12 in which highly warped shroud transitional portions near each blade replace the jogged transitional portions in FIG. 7. The most abrupt change in shroud geometry occurs at the leading edge of warp area 25 at each blade but the incidence, twist and camber variations are essentially the same as discussed previously and produce similar aerodynamic characteristics. The resulting performance gains are also similar and, although the structural characteristics of the latter may not be optimum, there are applications where its use will be desirable, particularly for lightly loaded propellers incorporating a fixed shroud.

FIG. 13 is a cross-section showing structural and pivot details which do not differ greatly from those of FIG. 8. FIG. 14 is an expanded view of projection 14—14 of FIG. 13 which illustrates the blade tip position and a transitional portion 25 showing warpage corresponding to the reversal of twist and camber near the blade tip when the shroud trailing edge is kept circular and the leading edge is jogged. FIG. 15 is a front view of FIG. 14 which highlights the leading edge warp.

It should be apparent that a shroud geometry incorporating both trailing edge jog and leading edge warp could also have useful applications. Furthermore, depending on the application and overall design objectives, combinations of the types illustrated may include geometry which closely approaches that of a shroud with no twist or camber variation. In such a case, some benefits might still be achieved although at a lower level.

Figure 16:
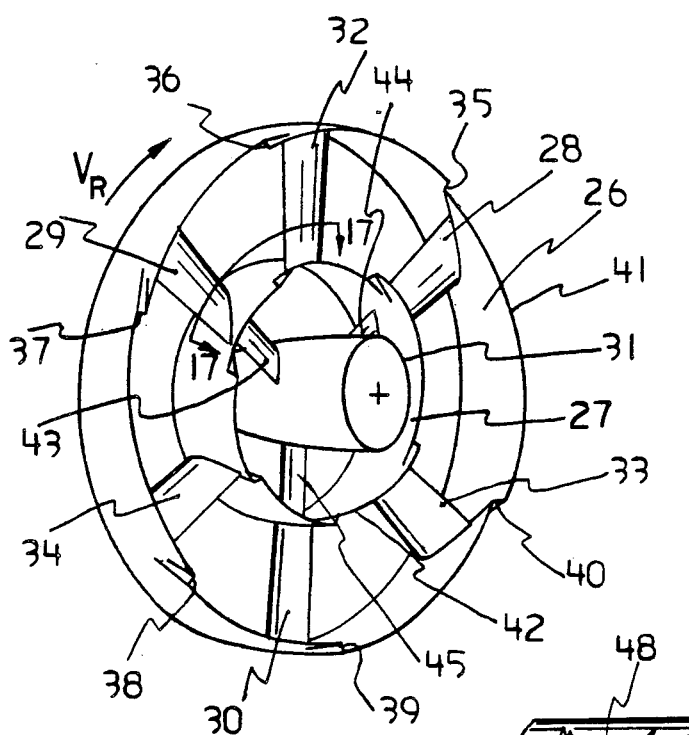
FIG. 16 is an oblique view of a six-bladed propeller incorporating two ring-shrouds; one surrounding the blade tips and the other at about ½ radius of the propeller disc.

In another variation of the ring-shrouded propeller concept, FIG. 16 shows a propeller with six blades incorporating an outer (tip) shroud 26 and an inner shroud 27 which is located radially as needed for a specific application. Generally the radius of the inner shroud would be in the range of 20% to 50% of propeller radius. In this arrangement, three of the blades 28, 29 and 30 are master blades, supported from hub 31 which houses the appropriate pitch control mechanism. Alternate blades 32, 33 and 34 are truncated and pivotally supported at their axes by the inner and outer shrouds and mechanically linked to blades 28, 29 and 30, thus maintaining all blades at the same angular position as determined by the pitch control within the hub. While all six blades could be supported individually at the hub, the arrangement shown is advantageous because it minimizes disturbances of the flow through the inner shroud. The outer (tip) shroud 26 is twisted and cambered between adjacent blades in a manner similar to that described for the three-bladed configuration (FIG. 7) with corresponding trailing edge jogs 35, 36, 37, 38, 39 and 40 behind each propeller blade. For the inner shroud 27, the twist and camber variations are linear but of the opposite sense to that of the outer shroud. The jogs behind each blade are also of the opposite sense. These features are of a magnitude to assure that the circulations from the blades are shed as constant vorticity distributions along the trailing edge 41 of the outer shroud and the trailing edge 42 of the inner shroud. The portions 43, 44 and 45 of the blades between the inner shroud and the hub are designed to carry no airload and to produce minimum disturbances in the flow between the inner shroud and the hub.

Figure 17:
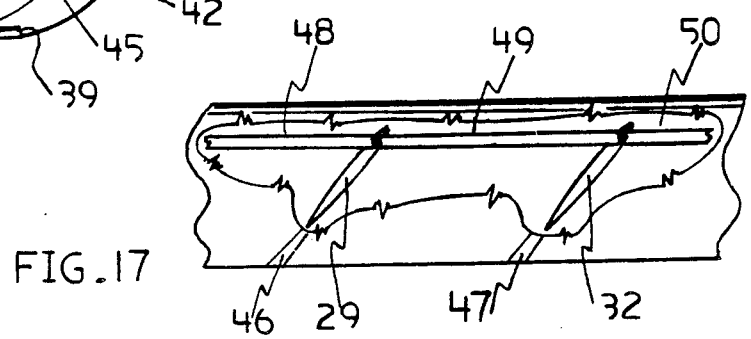
FIG. 17 is a cutaway section 17—17 from FIG. 16 which illustrates the linkage arrangement for coordinating the motions of the propeller blades.

FIG. 17 shows a typical section 17—17 taken in FIG. 16 involving the inner shroud and two adjacent blades. This view further illustrates the trailing edge configuration including the jogs 46 and 47 behind blades 29 and 32. Also shown are the linkage elements 48, 49 and 50 which connect all the blades in a manner that assures the same angular position for each blade as controlled by the master blades. These links lie within the shroud envelope and are not exposed to the airstream.

Figure 18:
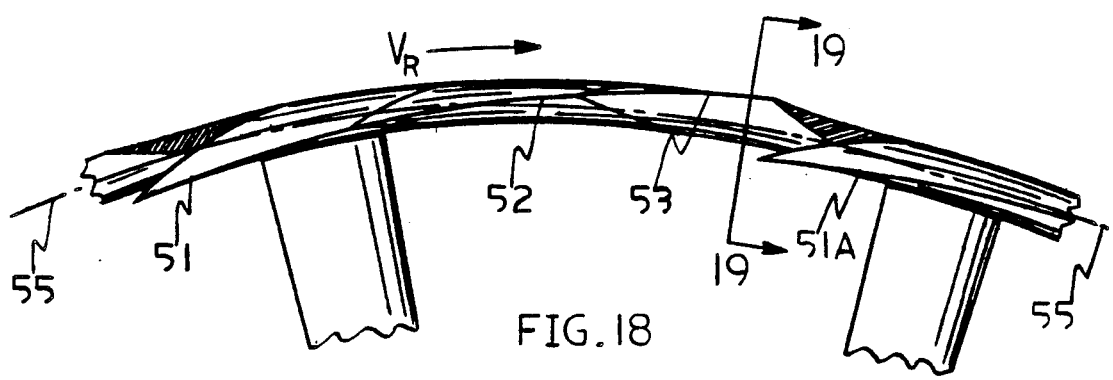
FIG. 18 is a rear view of a portion of a shroud illustrating an arrangement in which the trailing edge between adjacent blades is divided into three segments.
Figure 19:
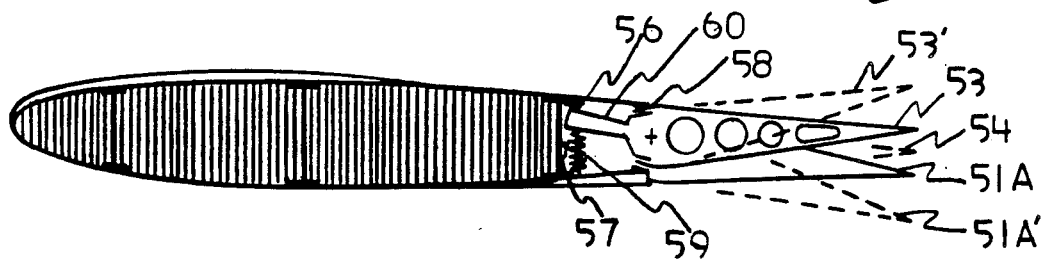
FIG. 19 shows a cross-section 19—19 from FIG. 18 illustrating the operation of trailing edge flaps and their support and balance scheme.

Although previous discussion has centered on shrouds with fixed geometry, the shroud may also incorporate flaps with proper actuation to allow trailing edge positions to vary continuously in relation to the loading on the shroud and blade surfaces, thus providing variable geometry of the shroud. This will accommodate various operating variables (mainly propeller blade angle, rotation speed and flight speed) and produce automatic adjustment of shroud loading to correspond closely to that for peak performance throughout a large range of operating conditions. FIG. 18 is a rear view of a shroud illustrating an arrangement in which the trailing edge between adjacent blades is divided into three segments (i.e., trailing edge flaps) 51, 52 and 53. FIG. 19 is a cross-section 19—19 from FIG. 18 which further illustrates the relationships between segments 51, 52 and 53 and indicates the position 54 of the trailing edge 55 for a shroud with no twist. Note that there is no connection provided between the ends of segments 51, 52 and 53 as there would be if these segments were fixed. Each segment is elastically constrained to allow movement in flap angle within limits (e.g. 53 to 53') set by internal stops 56 and 57. By using an open structural section 58, elastic warpage or twist of the flap is also allowed within appropriate limits. The flaps are hinged in the conventional manner and elastic constraints provided by springs 59. The aerodynamic hinge moment on a given flap is proportional to the flap angle and the local shroud angle-of-attack. Also, it is proportional to the propeller blade angle, rotational speed and flight speed. Since rotational speed also causes centrifugal forces on each flap segment, they would be dynamically balanced by incorporating weights 60 in the flap structure at appropriate spanwise and chordwise locations. These weight combinations produce flap deflection and twist in response to rotational speed. Thus, with the proper combination of elastic hinge constraints and balance weights, the flaps will automatically assume positions that are favorably coordinated with flight speed, rotational speed and propeller blade angle. This will result in the desired shroud geometry throughout the normal flight envelope to meet the operational requirements for the takeoff, climb, descent and landing flight segments.

Typically the shroud and flap combination would be designed to assume the shape desired for the operating condition corresponding to the lowest aerodynamic loading and maximum centrifugal force on the shroud (e.g. at take off). Flap deflections would be limited by suitable placement of stops 56 and 57 for both low-loading and high-loading conditions. As the combination of flight speed, rotational speed and blade angle changes, the flaps will deflect and twist under aerodynamic and centrifugal loads to assume the appropriate position for each operating condition. For an arrangement having an inner shroud, the trailing edge may be similarly divided into segments and the use of elastic constraints, balance weights and stops incorporated to effect the appropriate changes under load to match flight conditions.

The static thrust and low-speed performance of the ring-shrouded propeller will generally be sensitive to the shape of the shroud leading edge. Thus, for a shroud with fixed geometry, the nose contour curvature on the inside should be as low as possible without adversely affecting high speed characteristics. This will reduce local super-velocities which lead to flow separation and airfoil section stall. Proper selection of shroud airfoil incidence and camber as noted earlier will further enhance low speed performance.

Figure 20:
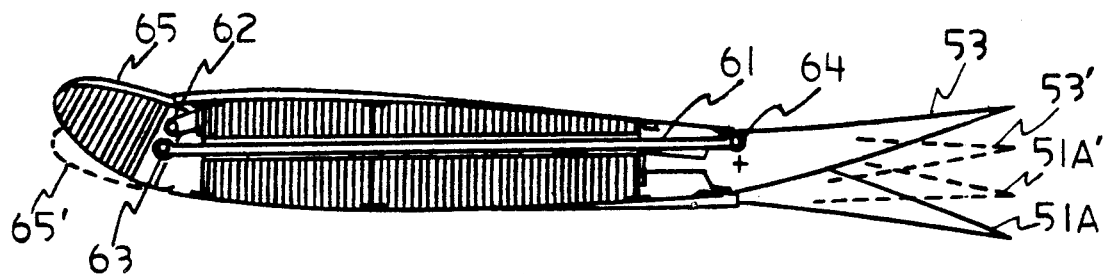
FIG. 20 shows a cross-section 20—20 from FIG. 21 which illustrates a ring-shroud incorporating linked leading-edge and trailing edge flap systems in typical operating positions.
Figure 21:
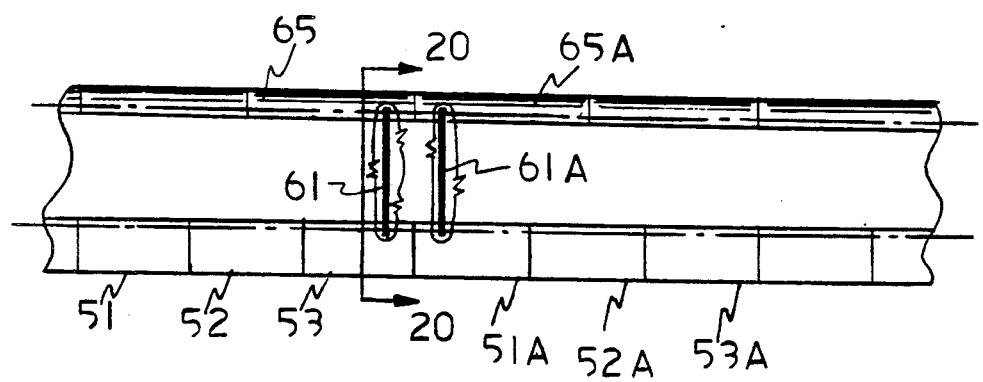
FIG. 21 is a partial plan view of a ring-shroud with linked leading-edge and trailing-edge flap systems illustrating configuration detail and the overall operational scheme.

The inclusion of the leading edge in the variable geometry can provide even more favorable low-speed and static characteristics with minimal effects on high-speed cruise performance. FIG. 20 shows an arrangement which combines leading edge flaps with trailing edge flaps disposed at intervals around the shroud circumference as shown in FIG. 21. The leading edge flap 65 is coupled to a corresponding trailing edge flap 53 through a push-rod 61 so that the position of the trailing edge flap controls leading edge flap position. The hinge position 62 is selected to minimize inside contour curvature when the flap 65 is deflected. The pivot locations 63 and 64 are chosen to provide maximum deflection of flap 65 when the trailing edge flap 53 is at its maximum deflection which would correspond to static or very low speed operating conditions. As the aircraft accelerates through takeoff and climb to cruise flight, the combined forces on the system cause the trailing-edge flaps to assume their cruise positions (e.g. 53,) thus moving the leading edge flaps to their faired positions 65' which is optimum for cruise flight. FIG. 21 shows a partial plan view of the ring-shrouded propeller with leading-edge and trailing-edge flaps which illustrates the overall arrangement of the combination. Thus each flap 65 is actuated by trailing-edge flap 53. The adjacent leading-edge flap 65A is actuated by trailing-edge flap 51A whereas flap 52A operates independently, usually over a small range of deflection. It is important to note that the combination 65A, 51A, 61A differs from the combination 65, 53, 61 previously described in that pivot point 64 is located on the other side of the trailing edge flap hinge line from that shown in FIG. 20. This provides the proper motion relationship since trailing-edge flap 51A moves in opposition to flap 53.

The previous discussion has focused on flap systems which automatically adjust to operating conditions. In some cases, it may be desirable to provide positive actuation for either trailing edge flaps or leading edge flaps (or both). A variety of schemes are possible which will introduce additional complexity and weight or performance penalties. However, a relatively simple concept would involve coupling the pitch of the propeller blades to flap motion through direct linkages contained within the shroud envelope. This could match some requirements but the flap motions would not be optimum over the complete operating range.

In all cases of trailing edge geometry variations, the variations are proportional to the camber of the shroud which, as explained above, varies specifically and cyclically around the shroud.

Although all of the illustrations used above apply to a single propeller, the fundamental techniques can be adapted equally well to a dual propeller arrangement with contra-rotation about a single axis whereby the slipstream rotation is eliminated. Since the rotors have blade twist, camber, pitch, etc. as well as rotations which are opposite in sense, the shrouds would also incorporate twists, jogs, etc. of opposite sense at corresponding locations.

Figure 22:
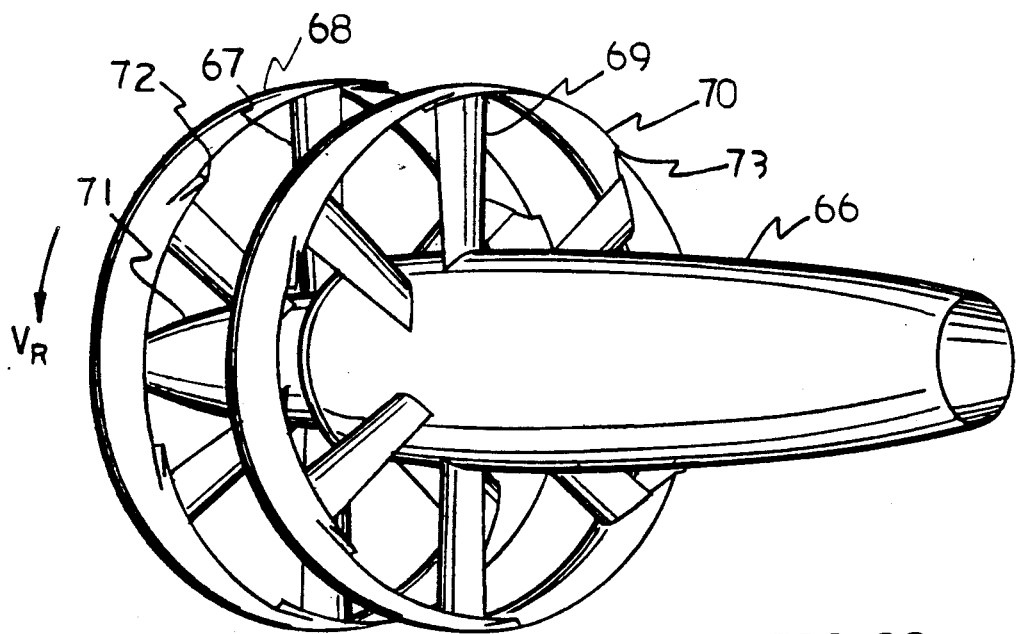
FIG. 22 is an oblique view of an arrangement combining a six-bladed propeller with ring-shroud and a six-bladed stator with ring shroud; both shrouds being supported at their unit-respective blade tips.

The same design principles can also be applied to a single propeller in combination with a stationary arrangement of radially oriented blades with one or several ring-shrouds which will also eliminate slipstream rotation. The stationary part of this combination is referred to as a stator which may not have the same diameter as the propeller. This combination is illustrated in FIG. 22 which shows a propeller with six blades, of which blade 67 is typical, incorporating a tip-mounted ring shroud 68 followed by a stator assembly with six blades, of which blade 69 is typical, incorporating a single, tip mounted ring-shroud 70. The stator is positioned behind the propeller and attached to the nacelle 66 which houses the engine. The propeller blades are pivotally attached to the hub 71 which is mounted to the engine drive shaft turning counter-clockwise in this view. The blades are rotatable by means of a conventional pitch mechanism in the hub to control the blade angles in the usual way. The ring-shrouds for both propeller and stator incorporate jogs, of which jogs 72 and 73 are typical, respectively, in each trailing edge. The shroud geometries in each case are designed in accord with the principles outlined previously to match the power and thrust requirements throughout the operating range of the system. The previously stated rule relating to opposite sense for certain geometric characteristics of the dual rotor arrangement will also apply to the rotor and stator. The stator blades may be fixed to the nacelle at angles required to cancel the slipstream rotation produced by the propeller. Vortices normally shed from all blade tips are also eliminated which leads to substantial improvements in efficiency, performance and noise. Complete elimination can be achieved for a given flight condition (usually cruise), but substantial elimination will also occur over a fairly wide range of operating conditions.

Alternatively, the stator blades may be pivotally mounted to the nacelle and rotatable by means of a pitch mechanism so as to provide essentially complete slipstream rotation cancellation and vortex elimination over the normal range of fight and operating conditions with corresponding improvements in efficiency, performance and noise. The actuating pitch mechanism will comprise linear actuators attached to a linkage system similar to that shown in FIG. 17 and contained entirely within the nacelle envelope.

I claim:

1. A ring-shrouded propeller comprising;
    a hub,
    a plurality of blades radially attached to said hub and at least one ring shroud attached to said blades,
    said ring-shroud having sections, each section extending between two of said adjacent blades and having a first end at one of said two blades and a second end at the other, at least one said ring shroud having a geometry in the form of airfoil, each said section having camber, at least one said ring shroud being structurally continuous and comprising identical said sections, said sections being adjacent to one another, each of said sections being twisted and said camber ranging between positive and negative with said camber being positive at said first end and negative at said second end, said camber varying essentially linearly, whereby there are transitional portions in at least one said ring shroud between adjacent ends of said two sections.

2. A ring-shrouded propeller according to claim 1, in which two sets of said blades and said ring shrouds are mounted axially spaced from one another.

3. A ring-shrouded propeller according to claim 1, in which there are two said ring shrouds concentrically mounted.

* * * * *